United States Patent [19]

Zach et al.

[11] 4,387,421

[45] Jun. 7, 1983

[54] OPTIMAL AND ADAPTIVE CONTROL OF VARIABLE SPEED AC MOTOR DRIVES

[75] Inventors: Franz C. Zach, Vienna, Austria; Bimal K. Bose, Latham, N.Y.; Paul M. Espelage, Salem, Va.; John S. Sicko, Schenectady, N.Y.

[73] Assignee: General Electric Company, Schenectady, N.Y.

[21] Appl. No.: 241,315

[22] Filed: Mar. 6, 1981

[51] Int. Cl.³ .................................. G05B 13/04
[52] U.S. Cl. .............................. 364/148; 318/811; 364/130; 364/149; 364/164
[58] Field of Search ....................... 364/148–151, 364/130, 174, 400, 483, 481, 492, 494, 495; 318/798–803, 810, 811; 363/40–43, 95–97, 131–138

[56] References Cited

U.S. PATENT DOCUMENTS

| 4,259,620 | 3/1981 | Oates et al. | 318/811 X |
| 4,316,132 | 2/1982 | Geppert | 318/811 X |
| 4,322,671 | 3/1982 | Kawada et al. | 318/811 X |
| 4,327,315 | 4/1982 | Kawada et al. | 318/811 |

OTHER PUBLICATIONS

Patel & Hoft, "Generalized Techniques of Harmonic Elimination & Voltage Control in Thyristor Inverters: Part I–Harmonic Elimination", IEEE Transactions on Industry Applications, vol. 1A-9, No. 3, May/Jun., 1973, pp. 310–316.
Patel & Hoft, "Generalized Techniques of Harmonic Elimination & Voltage Control in Thyristor Inverters: Part II–Voltage Control Techniques", IEEE Transactions on Industry Applications, vol. 1A-10, No. 5, Sep.-/Oct., 1974, pp. 666–673.
Casteel & Hoft, "Optimum PWM Waveforms of a Microprocessor Controlled Inverter", 1978 IEEE, pp. 243–250.
Buja & Indri, "Optimal Pulsewidth Modulation for Feeding AC Motors", IEEE Transactions on Industry Applications, vol. 1A-13, No. 1, Jan./Feb. 1977, pp. 38–44.
Jackson, "Multiple Pulse Modulation in Static Inverters Reduces Selected Output Harmonics & Provides Smooth Adjustment of Fundamentals", IEEE Transactions on Industry Applications, vol. 1GA-6, No. 4, Jul./Aug. 1970, pp. 357–360.
Murphy, Hoft & Howard, "Controlled–Slip Operation of an Induction Motor with Optimum PWM Waveforms", IEEE Electrical Variable Speed Driver Conf., Publ. #179, London, 1979, pp. 157–160.

Primary Examiner—Joseph F. Ruggiero
Attorney, Agent, or Firm—William H. Steinberg; James C. Davis, Jr.; Marvin Snyder

[57] ABSTRACT

A microprocessor based pulse-width modulated variable speed drive control system providing optimal switching angles based on minimizing r.m.s. current ripple. In addition, a closed loop double deadband control interacts with the optimal switching angles to insure close following of a desired function of a specified variable to be controlled.

4 Claims, 12 Drawing Figures

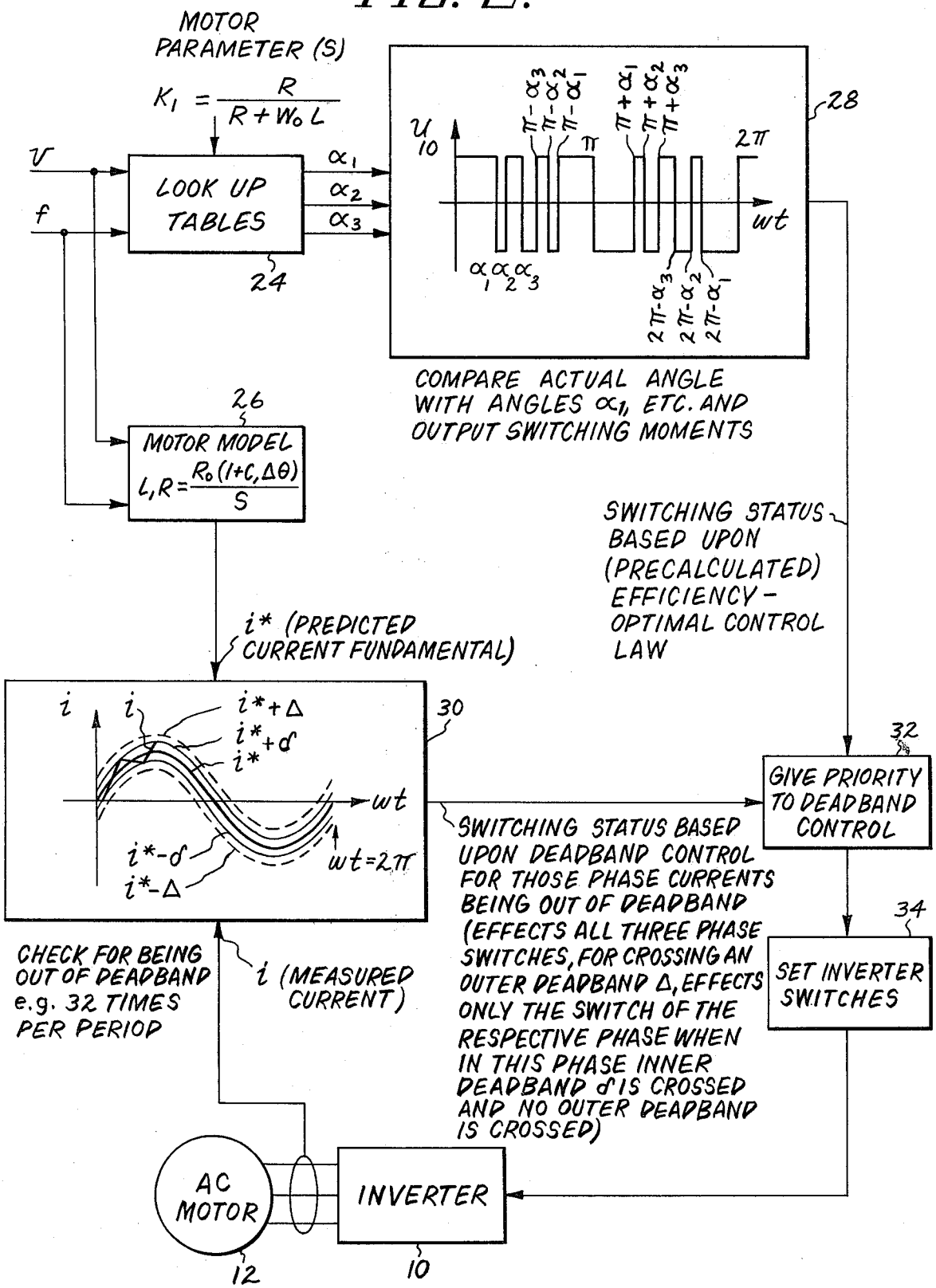

FIG. 3A.

$\alpha_1 \rightarrow$

| $V_{1rel.}$ ↓ / $K_1$ → | $0_{(R=0)}$ | 0.2 | 0.4 | 0.5 | 0.6 | 0.8 | 0.9 | 0.93 | 0.95 | 0.975 | 0.99 | 0.996 | 0.999 | 1 ($\iota=0$) |
|---|---|---|---|---|---|---|---|---|---|---|---|---|---|---|
| 0 | 60 | 60 | 60 | 60 | 60 | 60 | 60 | 60 | 60 | 60 | 60 | 60 | 60 | 60 |
| .1 | 61.18 | 61.18 | 61.18 | 61.17 | 61.19 | 61.15 | 61.14 | 61.14 | 61.13 | 61.13 | 61.12 | 61.04 | 61 | 60.98 |
| .2 | 62.41 | 62.40 | 62.39 | 62.39 | 62.38 | 62.34 | 62.31 | 62.29 | 62.28 | 62.25 | 62.16 | 62.29 | 62.13 | 62.06 |
| .3 | 63.70 | 63.68 | 63.66 | 63.65 | 63.63 | 63.59 | 63.50 | 63.46 | 63.39 | 63.09 | 61.88 | 61.29 | 61.08 | 61.02 |
| .4 | 65.01 | 64.99 | 64.95 | 84.93 | 64.90 | 64.99 | 64.63 | 64.51 | 64.36 | 63.90 | 62.99 | 61.77 | 61.52 | 61.45 |
| .5 | 66.43 | 66.39 | 66.35 | 64.31 | 66.26 | 66.08 | 65.82 | 65.63 | 65.41 | 64.94 | 64.64 | 61.93 | 61.53 | 61.43 |
| .6 | 68.02 | 67.98 | 67.92 | 67.87 | 67.81 | 67.58 | 67.31 | 67.13 | 66.89 | 65.93 | 62.34 | 61.55 | 61.31 | 61.24 |
| .7 | 69.83 | 69.76 | 69.65 | 69.58 | 69.48 | 69.41 | 68.69 | 68.33 | 67.98 | 67.14 | 63.61 | 62.32 | 61.94 | 61.84 |
| .8 | 72.05 | 71.92 | 71.71 | 71.57 | 71.39 | 70.76 | 69.76 | 68.79 | 68.39 | 68.04 | 63.33 | 61.42 | 61.42 | 61.12 |
| .9 | 75.97 | 75.84 | 75.66 | 75.53 | 75.37 | 78.87 | 71.76 | 69.65 | 69.28 | 69.01 | 62.38 | 62.06 | 61.92 | 61.87 |
| 1.0 | 83 | 83 | 83 | 83 | 84 | 80 | 76.40 | 71.85 | 70.70 | 69.50 | 63.70 | 63.40 | 63.30 | 63.26 |

FIG. 3B.

| v1rel \ α2 / K1 | 0 (R=0) | 0.2 | 0.4 | 0.5 | 0.6 | 0.8 | 0.9 | 0.93 | 0.95 | 0.975 | 0.99 | 0.996 | 0.999 | 1 (i=0) |
|---|---|---|---|---|---|---|---|---|---|---|---|---|---|---|
| 0 | 80 | 80 | 80 | 80 | 80 | 80 | 80 | 80 | 80 | 80 | 80 | | | |
| .1 | 79.25 | 79.24 | 79.22 | 79.23 | 79.23 | 79.70 | 79.18 | 79.15 | 79.12 | 79.13 | 79.11 | 79.87 | 87.17 | 87.24 |
| .2 | 78.51 | 78.50 | 78.49 | 78.47 | 78.47 | 78.44 | 78.40 | 78.38 | 78.34 | 78.27 | 78.21 | 86.26 | 86.30 | 86.31 |
| .3 | 77.85 | 77.83 | 77.82 | 77.81 | 77.81 | 77.80 | 77.84 | 77.83 | 77.94 | 77.81 | 78.13 | 85.14 | 85.12 | 85.11 |
| .4 | 77.11 | 77.09 | 77.06 | 77.04 | 77.01 | 76.93 | 76.85 | 76.80 | 76.75 | 76.61 | 76.37 | 80.58 | 80.82 | 80.86 |
| .5 | 76.48 | 76.45 | 76.40 | 76.36 | 76.31 | 76.13 | 75.87 | 75.69 | 75.48 | 75.10 | 74.89 | 78.60 | 78.57 | 78.56 |
| .6 | 76.07 | 76.03 | 75.97 | 75.92 | 75.86 | 75.64 | 75.39 | 75.21 | 74.99 | 74.13 | 74.89 | 76.11 | 75.92 | 75.89 |
| .7 | 75.85 | 75.79 | 75.68 | 75.61 | 75.51 | 75.16 | 74.74 | 74.45 | 74.16 | 73.60 | 72.14 | 72.23 | 72.24 | 72.24 |
| .8 | 76.04 | 75.90 | 75.69 | 75.55 | 75.38 | 74.77 | 73.79 | 72.82 | 72.45 | 72.18 | 71.41 | 70.58 | 70.40 | 70.36 |
| .9 | 77.96 | 77.84 | 77.67 | 77.56 | 77.41 | 74.86 | 73.28 | 71.67 | 71.33 | 71.09 | 67.81 | 65.65 | 64.48 | 65.73 |
| 1.0 | 83 | 83 | 83 | 83 | 84 | 80 | 76.40 | 71.85 | 70.70 | 69.50 | 64.50 | 64.25 | 64.15 | 64.12 |
|  |  |  |  |  |  |  |  |  |  |  | 63.70 | 63.40 | 63.30 | 63.20 |

FIG. 3C.

| $v_{rel.}$ \ $K_1$ | 0 (R=0) | 0.2 | 0.4 | 0.5 | 0.6 | 0.8 | 0.9 | 0.93 | 0.95 | 0.975 | 0.99 | 0.996 | 0.999 | ($\iota$=0) |
|---|---|---|---|---|---|---|---|---|---|---|---|---|---|---|
| 0 | 80 | 80 | 80 | 80 | 80 | 80 | 80 | 80 | 80 | 80 | 79.87 | 87.17 | 87.22 | 87.21 |
| .1 | 81.11 | 81.11 | 81.09 | 81.10 | 81.10 | 81.09 | 81.08 | 81.05 | 81.03 | 81.04 | 81.02 | 88.22 | 88.30 | 88.32 |
| .2 | 82.18 | 82.18 | 82.18 | 82.17 | 82.17 | 82.17 | 82.16 | 82.16 | 82.12 | 82.09 | 82.10 | 88.87 | 88.99 | 89.04 |
| .3 | 83.26 | 83.26 | 83.26 | 83.27 | 83.28 | 83.32 | 83.43 | 83.45 | 83.62 | 83.77 | 85.16 | 88.09 | 88.51 | 88.61 |
| .4 | 84.23 | 84.23 | 84.23 | 84.23 | 84.23 | 84.26 | 84.32 | 84.38 | 84.46 | 84.74 | 85.33 | 88.59 | 88.78 | 88.83 |
| .5 | 85.19 | 85.13 | 85.18 | 85.18 | 85.18 | 85.16 | 85.15 | 85.14 | 85.14 | 85.24 | 85.27 | 88.88 | 89.05 | 89.11 |
| .6 | 86.19 | 86.19 | 86.19 | 86.19 | 86.19 | 86.19 | 86.19 | 86.18 | 86.19 | 86.23 | 87.57 | 88.35 | 88.57 | 88.64 |
| .7 | 87.16 | 87.16 | 87.16 | 87.16 | 87.16 | 87.17 | 87.19 | 87.21 | 87.25 | 87.49 | 88.60 | 88.97 | 89.13 | 89.19 |
| .8 | 88.10 | 88.10 | 88.09 | 88.09 | 88.09 | 88.10 | 88.09 | 88.07 | 88.10 | 88.17 | 88.34 | 88.06 | 87.32 | 88.39 |
| .9 | 89.08 | 89.09 | 89.10 | 89.10 | 89.11 | 89.04 | 89.06 | 89.04 | 89.06 | 89.09 | 89.03 | 89.09 | 89.12 | 89.13 |
| 1.0 | 90 | 90 | 90 | 90 | 90 | 90 | 90 | 90 | 90 | 90 | 90 | 90 | 90 | 90 |

$\alpha_3$

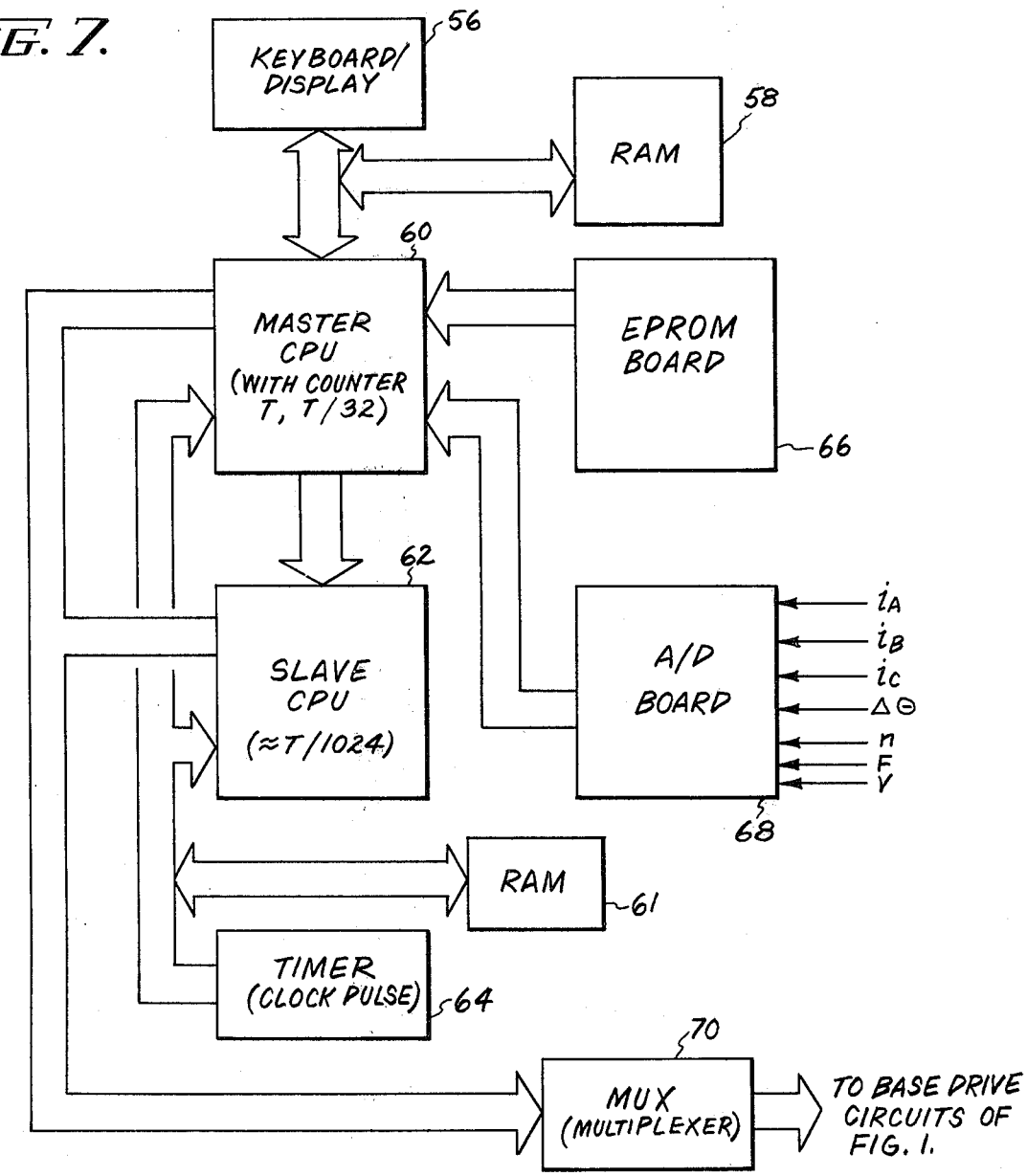

OPTIMAL AND ADAPTIVE CONTROL OF VARIABLE SPEED AC MOTOR DRIVES

This application relates generally to alternating current machine drive systems and more specifically to microprocessor based pulse width modulation drive systems.

A common technique for controlling the conduction of inverter solid state switching devices is that of pulse-width modulation whereby each of the solid state switching devices is alternately rendered conductive at a frequency more than twice the desired inverter output voltage frequency, producing an inverter output voltage waveform having a series of positive and negative voltage pulses. The output voltage pulse-width and hence, the inverter output fundamental voltage amplitude is controlled by adjusting the conduction duration of each inverter solid state switching device. The inverter output fundamental voltage frequency is determined by the solid state switching device conduction frequency.

Progress in power electronics and microprocessors have made it possible to apply inverters and AC motors to variable speed drives. Thus, the advantages of AC motors can be enjoyed in variable speed drives, giving more reliable motor performance, less weight, and less maintenance problems compared to conventional DC motor drives.

It is an object of the present invention to provide a microprocessor based PWM machine control combining open loop and closed loop control.

It is an object of the present invention to minimize RMS ripple current supplied to the machine by optimizing the pulse-width of pulses supplied to an inverter, to the machine parameters.

SUMMARY OF THE INVENTION

In one aspect, the present invention relates to a microprocessor based pulse-width modulated variable speed drive control for providing optimal switching angles based on minimizing RMS current ripple. The angles can be precalculated and are a function of the commanded frequency and commanded voltage as well as the motor parameters.

In another aspect, the present invention provides a closed loop double deadband control where more than one of the phase voltages is effected when the outer deadband is crossed in order to provide maximum control of the variable under consideration.

In still another aspect of the present invention, the optimal switching angles and the closed loop deadband controls interact to insure close following of a desired function of a specified variable to be controlled.

DESCRIPTION OF THE DRAWINGS

While the specification concludes with claims particularly pointing out and distinctly claiming the present invention, the objects and advantages of the invention can be more readily ascertained from the following description of a preferred embodiment when used in conjunction with the accompanying drawing in which:

FIG. 2 is a functional block diagram representation of an optimal and adaptive control in accordance with the present invention.

FIGS. 3a, b, and c are summaries of tables of the optimal switching angles.

FIG. 7 is a hardware block diagram of the present invention.

DESCRIPTION OF THE PREFERRED EMBODIMENT

Figure 1:
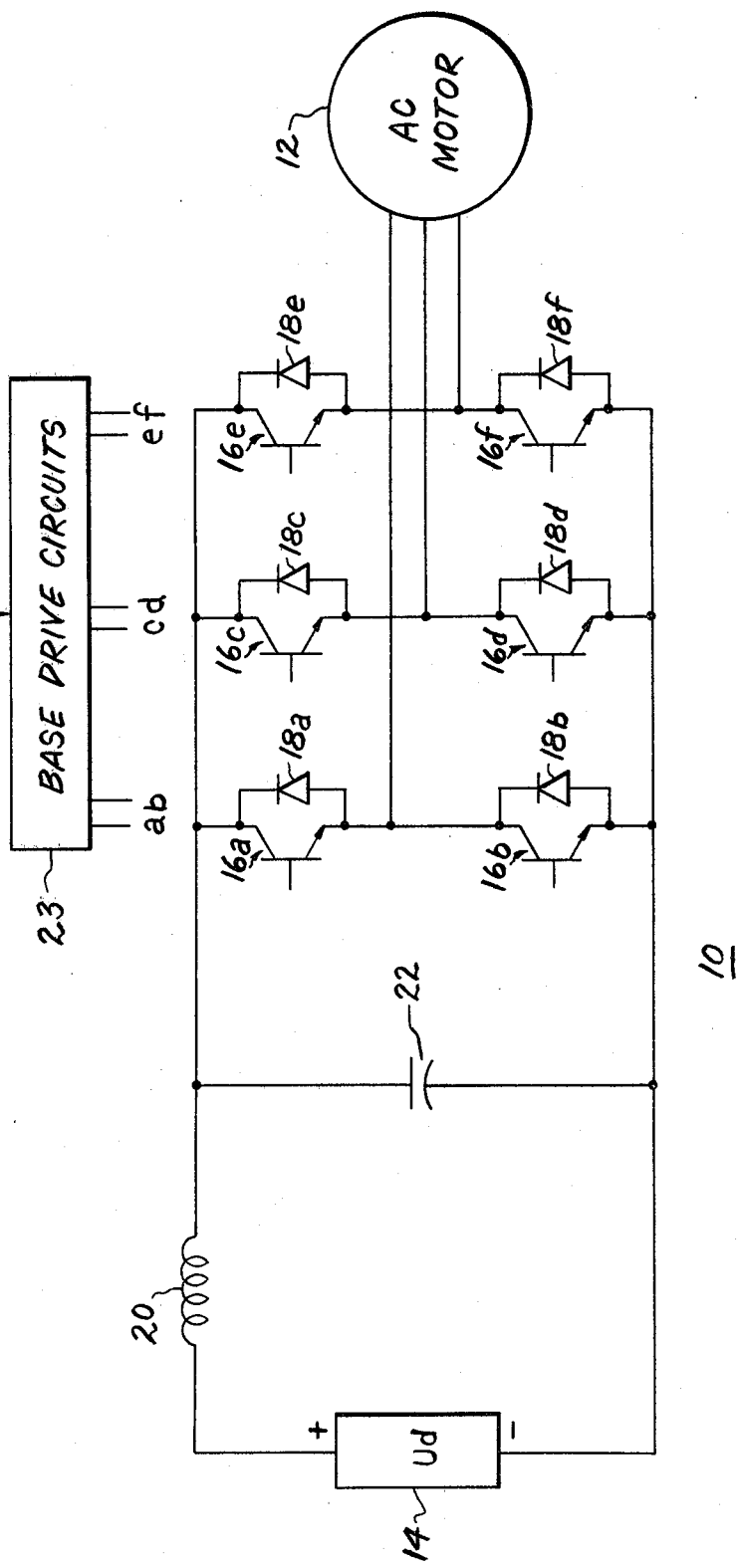
FIG. 1 is an inverter suitable for use with the present invention.

Referring to FIG. 1, an inverter 10 suitable for use with the present invention is shown. The inverter 10 supplies variable frequency power to an AC machine 12 from a direct current source 14 which can be a rectifier. In the present preferred embodiment, the AC machine is a three phase induction machine and inverter 10 therefore comprises three pairs of switching devices, shown as transistors 16a and 16b, 16c and 16d, and 16e and 16f respectively, with the transistors of each pair coupled in series fashion, and each of the transistor pairs coupled across direct current source 14. The junctions between transistors 16a, 16b, 16c and 16d, and 16e and 16f are respectively coupled to one of three phases of the AC machine 12. Typically, each of transistors 16a-f are high current NPN transistors. Coupled in parallel opposition with the collector emitter portion of each of transistors 16a-f is one of diodes 18a-f, respectively. Each of the diodes 18a-f provides a conductive path across an associated one of transistors 16a-f for reactive current when the associated transistors turns off.

An inductor 20 is in series with the DC source 14. A filter capacitor 22 is coupled in parallel with transistor pairs 16a-f and together with the inductor 20 filters the voltage supplied by the direct current source. Connected to the bases of each of the transistors 16a-f is a base drive circuit 23 which receives the switching signals for the inverter.

Referring now to FIG. 2 a functional block diagram of the present invention is shown. An operator voltage command V and an operator electrical frequency command F are connected to a look up table 24 and a motor model 26. Look up table 24 contains the optimal switching angles for minimizing harmonic motor losses. The switching angles determine the width of the pulses supplied to the inverter. The angles are determined by minimizing the following expression:

$$P = \Sigma i_\nu^2 R_o$$

$$\nu = 5, 7, 11, 13, 17, 19, - \tag{1}$$

where

P is the ohmic copper loss in the motor due to harmonics, $i_\nu$ are the current harmonics (rms values).

$R_o$ is ohmic motor resistance $\nu$ is the number of the harmonic $\nu = 1$ for the current fundamental. $\nu = 3, 6, 9, 12$ — do not have to be considered due to the three phase connection cancelling the triplen harmonics. Even $\nu$ do not have to be considered because of the symmetry of the voltage. A factor of ½ would be needed in the summation of equation 1 if amplitudes $i_\nu$ rather than rms values were used.

Figure 4:
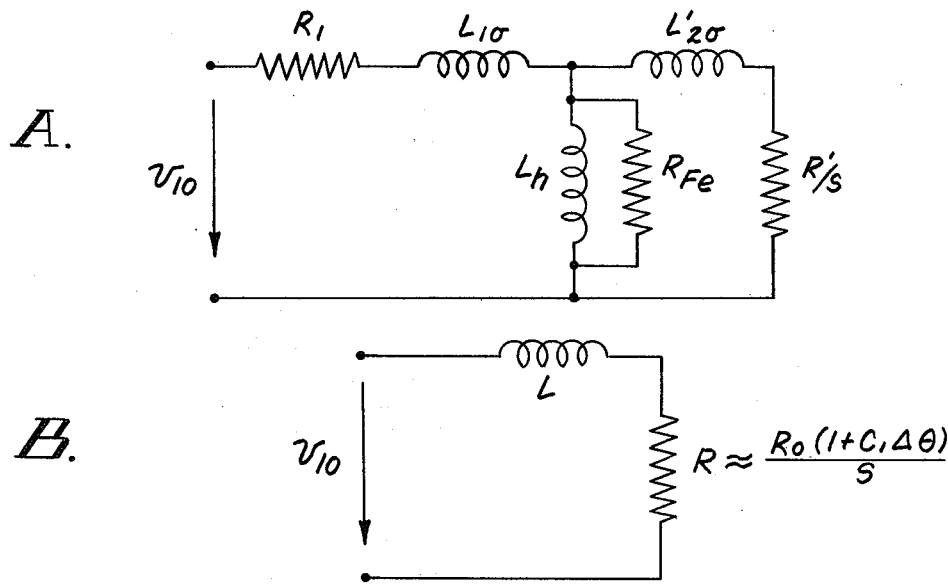
FIGS. 4a and b is a schematic diagram representations of the motor models used in the present inventions.

The relationship between voltage and current is as follows:

$$i_\nu = \frac{V_\nu}{\sqrt{R_o^2 + (\nu \omega_o L)^2}} \quad (2)$$

where $V_\nu$ is the voltage harmonic $R_o$ is the complete motor resistance shown in FIG. 4b.

L is the motor inductance shown in FIG. 4b.

$\omega_o$ is the inverter output frequency for the voltage fundamental (equal to the synchronous motor frequency F)

If three switching angles $\alpha_1$, $\alpha_2$, and $\alpha_3$ per quarter period are chosen, the harmonics (including the fundamental $V_1$) are given by $$V_1 = \frac{4Ud}{\pi} (1 - 2\cos\alpha_1 + 2\cos\alpha_2 - 2\cos\alpha_3) \quad (3)$$

$$V_n = \frac{4Ud}{\pi} (1 - 2\cos n\alpha_1 + 2\cos n\alpha_2 - 2\cos n\alpha_3) \quad (4)$$

where Ud is the DC voltage available from DC source 14 $V_\nu = V_\nu \sqrt{2}$.

The appropriate voltage harmonics from equation (4) are substituted into equation (1). A computer search routine can be used to minimize P of equation (1) by generating $\alpha_1$, $\alpha_2$ and $\alpha_3$.

Three switching angles per quarter period provide one angle for controlling the voltage fundamental and two angles for the minimization of equation (1). Three switching angles have been selected in the preferred embodiment as a compromise between switching losses in the inverter and harmonic losses in the motor. More switching angles give the possibility of reducing the motor current harmonic loss, but produce more switching losses. At lower frequencies more switching angles would be desirable.

The parameters for looking up switching angles in the table are $V_{rel}$ defined by the ratio of $$\frac{V_1}{V_{max}},$$

where $V_1$ is the voltage fundamental at the commanded frequency and $V_{max}$ is the the voltage fundamental from 100 to 500 Hz, and $$K_1 = \frac{R}{R + \omega_o L}.$$

In the present embodiment, the commanded frequency can vary from 0.2 Hz to 500 Hz. Above 100 Hz the inverter is supplied with square waves or, in other words, only one switching angle per quarter period. A summary of the switching angles $\alpha_1$, $\alpha_2$ and $\alpha_3$ are shown in FIGS. 3a, b, and c for 0.1 steps of $V_{rel}$ and significant (i.e. not equal steps, but steps where noticeable differences of the $\alpha_i$ can be seen) steps of $K_1$.

The optimal angles $\alpha_1$, $\alpha_2$, and $\alpha_3$ are converted to optimal switching times in block 28 for the entire period. This is accomplished by first determining the switching angles for the entire period. In the first quarter $\alpha_1$, $\alpha_2$, and $\alpha_3$ are the switching angles. In the second quarter, $\pi - \alpha_3, \pi - \alpha_2$ and $\pi - \alpha_1$, are the switching angles. For $\pi$ to $2\pi$ the angles are the same as from 0 to $\pi$ but the resulting waveform has to be inverted. The switching angles are converted to switching times once the commanded frequency and motor slip are known.

The motor model 26, shown in more detail in FIGS. 4a and b, also receives operator voltage and frequency command V and F. The values L and $$R = \frac{R_o(1 + C_1\Delta\theta)}{S}$$

in the motor model are obtained from the more detailed motor model in FIG. 4a where $V_{10}$ is the phase voltage, $R_1$ is the stator resistance, $L_{1\sigma}$ is the stator leakage inductance, $L_h$ is the magnetizing inductance, $L'_{2\sigma}$ is the rotor leakage inductance referred to the stator, $R_{FE}$ is the eddy current resistance (representing the losses), $R'/S$ is the rotor resistance referred to the stator and divided by the slip.

FIG. 4b shows an equivalent circuit of FIG. 4a, where R is the complete motor resistance, $R_o$ is the motor resistance at base temperature $\theta_o$ (e.g. 20° C.), $C_1$ is the temperature constant, $\theta_o$ is the base temperature (e.g. 20° C.), $\Delta\theta$ is the temperature deviation from $\theta_o$, and S is the slip.

The voltage fundamental is a sinusoid having the commanded amplitude and frequency which is applied to the motor model to generate a predicted current fundamental i*. The current fundamental is used as a reference or set value in a deadband or bang-bang control in block 30. The predicted current fundamental i* is not a control input and is not known beforehand. It has to be calculated from the motor model.

Deadband width is a funtion of commanded frequency such that the i* reference sine wave is followed more closely the lower the frequency becomes. The first deadband is at i*+δ and i*−δ where δ is a function of frequency. Measured current i taken from each phase of the motor 12 is compared to the deadbands. If the measured current exceeds the upper or lower deadband then only the inverter phase associated with that inverter current is affected. If, for example, the current in the A phase exceeds i*+δ, then the lower transistor in the transistor pair in FIG. 1 corresponding to that motor phase is turned on after the upper transistor has been turned off.

A second deadband can be added located at i*+Δ and i*−Δ, to detect motor current that might continue to increase past the first deadband, due to adverse circumstances such as load changes. When the outer deadband is crossed by one of the measured motor currents, inverter switches in all three phases will be affected, so that maximum control can be exerted over the current. Thus, for example, if a single phase current exceeds the outer deadband, i*+Δ, then the lower transistor switch associated with that phase will be turned on after the upper transistor in that phase is turned off and, in addition, the upper transistor in the other two phases will be turned on after the lower transistor has been turned off.

In block 32, the switching times determined from the lookup table is compared to the switching times determined by the deadband control. When there is a conflict, priority is given to the deadband control. The determination of priority is explained in more detail herein below in connection with the flow chart of FIG.

5. The switch signals from block 32 are used to set the base drives in block 34 and thereby control the inverter 10.

Figure 5:
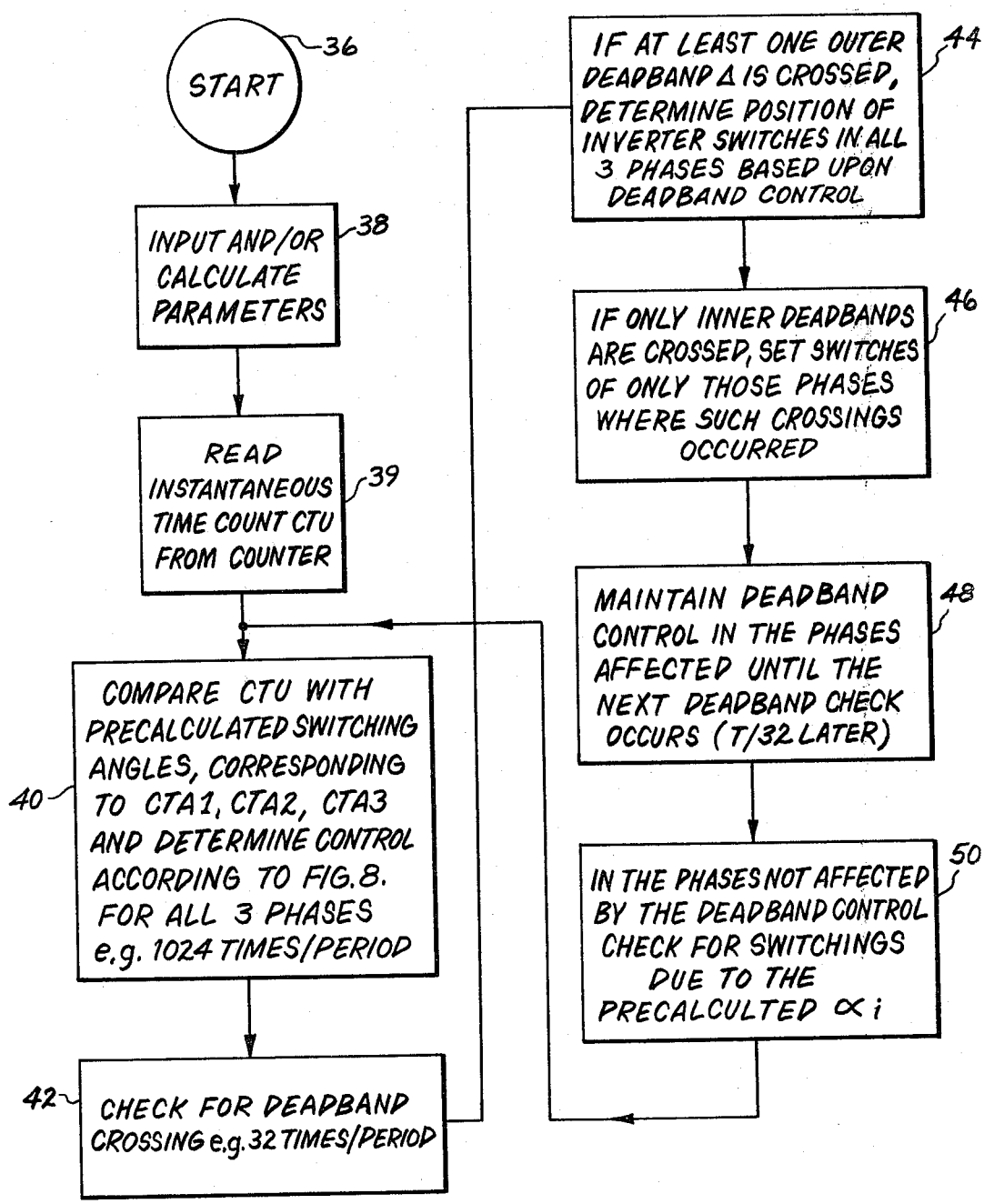
FIG. 5 is a block diagram illustrating the priority of the deadband control over the optimum switching angles.

Referring now to FIG. 5, when the program is first initialized at 36, the various inputs such as machine speed, currents, and motor temperature are detected from sensors. The keyboard is used to enter motor parameters. Necessary values based on sensed entered parameters are calculated. The program initialization is explained in greater detail in connection with FIG. 8 which contains a more detailed flow chart. In block 40 a counter CTU which serves as a time base for a phase voltage of the motor is compared to counters CTA1, CTA2, and CTA3 which are set at values representing switching times corresponding respectively to the switching angles $\alpha_1$, $\alpha_2$ and $\alpha_3$. Switching times for the other two phases are obtained by adjusting the time base and again comparing it to the switching angles. The comparison of the counter CTU with counters CTA1, CTA2 and CTA3 can be made for example 1024 times/period or on another time dependent basis as shown in FIG. 7. Next in block 42 a check is made to see if the inner or outer deadband has been crossed. This check can occur, for example, 32 times/period. If an outer deadband is crossed then the switching signals for each phase of the inverter are determined to have the maximum effect on controlling (reducing or increasing) the current that crossed the outer deadband. In block 46, if only the inner deadband has been crossed, then switching signals affecting the inverter switches of the phase that crossed the inner deadband will be affected.

Figure 6:
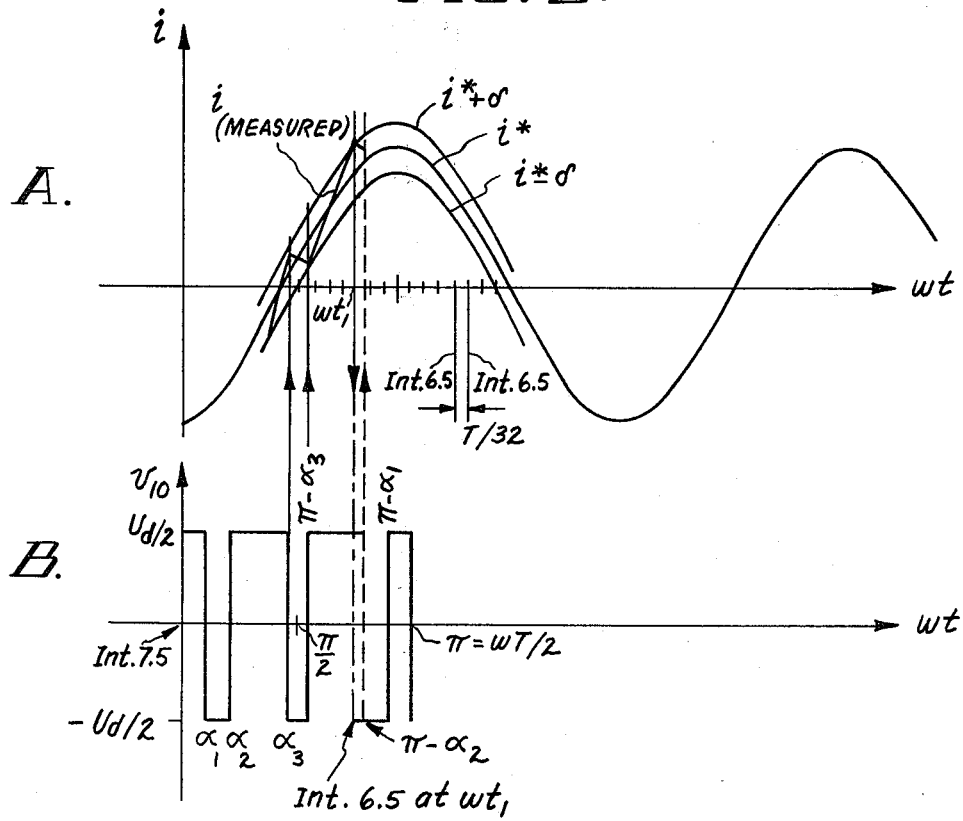
FIGS. 6a and b are waveform diagrams illustrating the priority of the deadband control over the optimum switching angles.

In block 48, the inverter switch changes resulting from the deadband control are maintained until the next deadband check occurs. Thus, for example, if an inner deadband has been exceeded resulting in a switching signal to the appropriate inverter switch, a predetermined switching angle occurring thereafter but before T/32 has passed, will be ignored. This is illustrated in the waveform of FIG. 6a. At $\omega t_1$ the deadbands were checked and the measured current was seen to exceed the upper inner deadband. This resulted in the switching of the inverter switch and the corresponding change in the waveform in FIG. 6b. The optimum switching angle $\pi - \alpha_2$ does not affect the waveform in FIG. 6b because it comes less than T/32 after the deadband was found to be exceeded.

In block 50, the phases not affected by the deadband control are determined and in block 40 these phases are checked for optimum switching angles until interrupted at T or T/32.

FIG. 7 is a hardware diagram for the present invention having a keyboard 56, RAM 58 associated with the master CPU, master CPU 60, RAM 61 associated with the slave CPU, slave CPU 62, timer 64, EPROM 66, A/D converter 68 and multiplexer 70, all interconnected by a bus consisting of data, control and address lines.

The keyboard/display 56 is used to enter the following data into a RAM 58:

| | | |
|---|---|---|
| peak value of stator supply voltage at 0 Hz | $V_o$ | 0 to 99.9, steps of .1V |
| maximum amplitude stator supply voltage at 100 Hz | $V_m$ | 0 to 999.9, steps .1V |
| constants for inner deadband | $C_o$ | 0 to 99.99, steps of .01 |
| | $C_1$ | 0 to 99.99, steps of .01 |
| $\delta = C_o + C_1F + C_2F^2$ constant for outer deadband | $C_2$ | 0 to 99.99, steps of .01 |
| $\Delta = C_3\delta$ | $C_3$ | 0 to 99.9, steps of .1 |
| resistance of simple motor model at 20° C. | $R_o$ | 0 to 99$\Omega$, steps of .1$\Omega$ |
| constant for resistance increase with temperature $\Delta\theta$ | CR | 0 to .99[1/°C.], steps of .01/°C. |
| reactance of simple motor model | L | 0 to 9999mH steps of 1mH |
| number of pole pairs of the motor being controlled | PP | 1 to 16, steps of 1 |
| temperature variation as compared to 20° C. | $\Delta\theta$ | −99 to +99, steps of .01 |

The master CPU handles all calculations except for the comparison of the optimum switching times with the CTU counter. This last determining is handled by the slave CPU. In the present embodiment the master and slave CPU are Intel 8085's. A timer 64 provides the clock pulses to the master CPU so that interrupts can occur at T and T/32. The timer provides clock pulses to the salve CPU so that the CTU timer can be updated every T/1024. The 12K EPROM in block 68 provides 4 look up tables including the optimum switching angles.

Analog data is entered through the A/D conversion board 68. The date monitored includes the 3 motor phase currents, the temperature of the motor, motor speed, frequency command F and voltage command V. The master CPU 60 outputs deadband switching signals and the slave CPU 62 outputs switching signals based on the optimum switching angles. Multiplexer 70 gives priority to the switching signals from the master CPU. This task could also be accomplished by software. The output of the multiplexer 70 contains switching signals for each transistor switch and is connected to the base drive circuit of the inverter.

Figure 8:
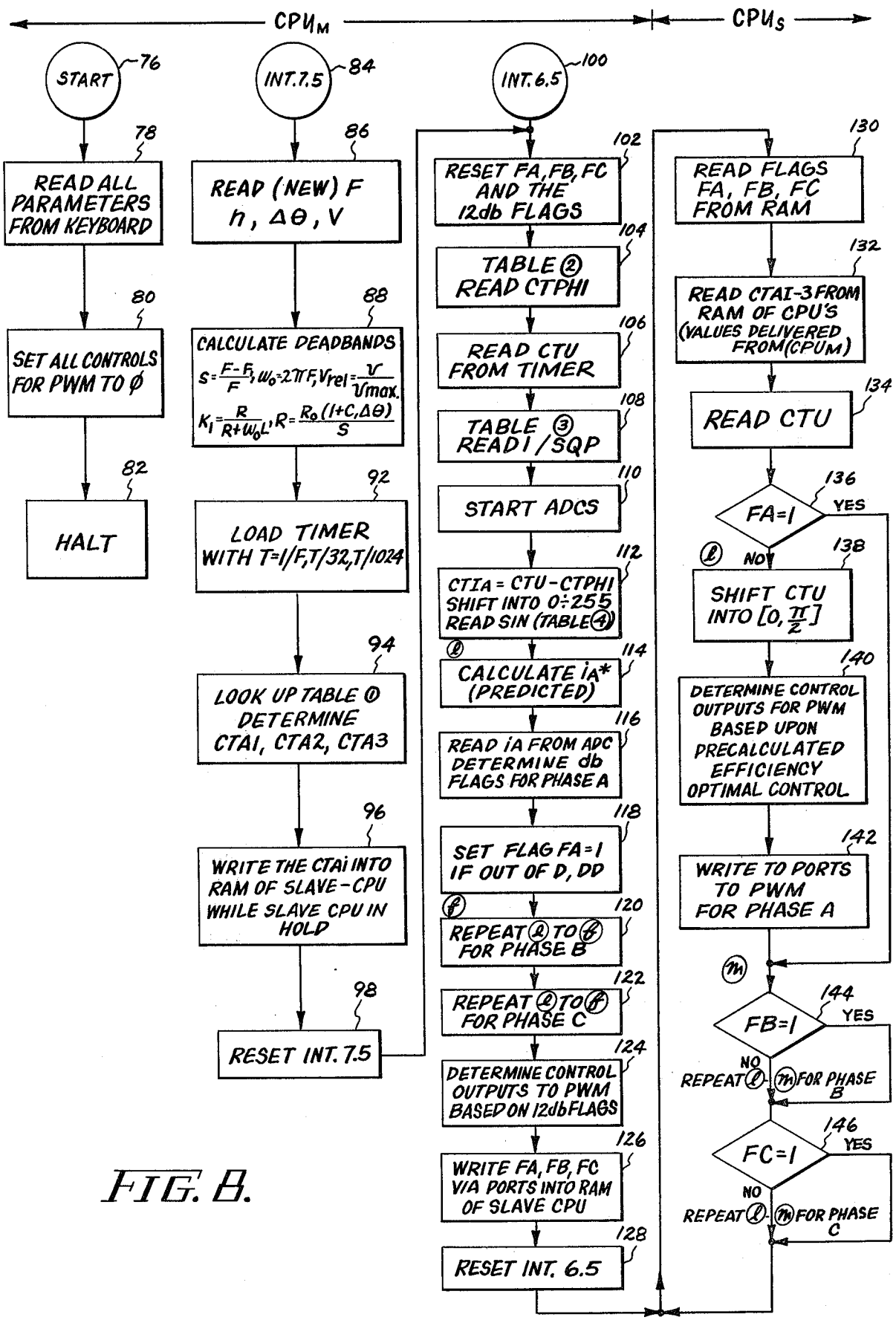
FIG. 8 is a flow chart in accordance with the present invention.

Referring now to the detailed flow chart of in FIG. 8, initialization begins at block 76. In block 78, the parameters described with reference to the hardware diagram are read into the RAM. In block 80 all the PWM controls are set equal to 0 and in block 82 the program is halted. An interrupt 84 occurs every period T. During interupt 84 the frequency command F, the stator voltage fundamental V, the motor speed n, and the motor temperature is read from the A/D converters in block 86. In block 88 the motor slip s is calculated from the commanded frequency F, number of poles PP, and motor speed n, $$\left(s = \frac{F - n \times PP}{F}\right),$$

where $n \times PP = F_1$. In addition, the following parameters are calculated: actual motor (rotor) frequency $F_1$, frequency in radians per second $\omega$, $K_1$, relative voltage $V_{rel}$, complete motor resistance R, and inner and outer deadband width. The timers for the interrupts are loaded with T, T/32 and the CTU is loaded with T/1024, with the period T determined from the new F as given e.g. by a motor speed controller. F is the frequency of the PWM inverter output voltage as supplied to the stator of the motor.

The value of $K_1$ and the ratio of $$\frac{V}{V_{rel}}$$

are used to look up $\alpha_1$, $\alpha_2$ and $\alpha_3$ in the look up table 1 in the EPROM 66 of FIG. 7. The values obtained from the table are CTA1, CTA2, and CTA3 which are counts from 0 to 255 corresponding to angles of 0 to $\pi/2$. CTA1, CTA2, and CTA3 are written into the slave CPU RAM 61 when the slave CPU is in hold. Interrupt 84 is reset next in block 98. The steps which are triggered by interrupt 100 are next begun. First, flags used in the deadband control are reset in block 102. Flags are one bit messages used to determine whether a particular event has occurred. Resetting a flag sets it to zero. In block 104, the angle $\phi$ is determined from table 2 located in the EPROM. $\phi$ is the phase difference between the fundamental voltage and the predicted current. The phase difference arises because of the reactive components in the motor model. Table 2 contains the $$\text{Arc tan}\left(\frac{1}{K_1} - 1\right).$$

The angles in the table are represented by counts from 0 to 255 corresponding to 0 to $\pi/2$. The value of the time base at this instant is next read from the CTU timer. The CTU counts of 0 to 1024 correspond to 0 to $2\pi$.

In block 108, the variable 1/SQP is determined from table 3 of the EPROM. The table contains $$\frac{1}{SQP} \: 1/\sqrt{1 + \left(\frac{1}{K_1} - 1\right)^2}$$

which is needed later to calculate predicted current. The analog to digital converters are started in block 110 so that the digital quantities will be available when needed several steps below. In block 112 the phase angle difference used to determine the value of sine ($\omega t - \phi$) in the time frame is set up by the time base timer CTU. In block 115 the magnitude of the predicted current in phase A is determined by dividing the magnitude of the voltage by complete resistance R times (1/SQP). The value of i*$_A$ is then known because the magnitude of the sinusoid multiplier as well as the sinusoid instantaneous value is known.

The value of the actual motor current is read from the analog to digital converters, which have had time to settle, in block 116. Also, in block 116 the actual current of phase A is checked to see if the inner and outer deadbands, which are a function of i$_A$* and frequency, have been crossed. There are 4 deadband flags for each phase, 12 in all. One flag each in each phase corresponding to the upper and lower inner deadbands and upper and lower outer deadbands. When a deadband has been crossed, the corresponding flag is set by setting the flag equal to one.

In block 118, an additional flag FA is set if any of the 4 deadband flags associated with phase A were set. In block 120, blocks 114, 116 and 118 are repeated for phase B and in block 122 blocks 112, 114, 115 and 118 are repeated for phase C. In block 124, the outputs to be sent to the base driver of FIG. 1 are determined dependent on the 12 db flags. The outputs to the base driver consist of either a one or a minus one for each phase, which corresponds to the switching of the upper or lower inverter switch on after turning the lower or upper switch off, respectively.

In block 126, the flags FA, FB, and FC are written in the RAM of the slave CPU. Interrupt 100 is reset in block 128.

All the previous steps described in reference to FIG. 8 were performed by the master CPU. The steps that follow are performed by the slave CPU.

In block 130, flags FA, FB and FC are read from the RAM of the slave CPU and in block 132 the values of CTA1, CTA2, and CTA3 are also read from the RAM. The present count of the CTU is read in block 134 which is an indication of where in the period we are at this moment. Decision block 136 determines whether or not flag FA has been set. If the flag has been set, then, because the deadband controls have priority, no check is made in the A phase to see if any predetermined angles have been reached. If, however, there has been no crossing of the deadbands by the phase A currents in the last check, (flag FA has not been set), then the time base timer CTU is compared to the switching angles. This is accomplished for CTU counts equivalent to 0 to $\pi/2$ by direct comparison to the switching angles. For CTU counts equivalent to $\pi/2$ to $\pi$, the comparisons are made by shifting the CTU count to $0 - \pi/2$ and comparing the count to $\pi/2 - \alpha_3$, $\pi/2 - \alpha_2$, $\pi/2 - \alpha_1$. Higher counts of the CTU equivalent to $\pi - 3\pi/2$ and $3\pi/2 - 2\pi$ are handled as $0 - \pi/2$ and $\pi/2 - \pi$, respectively except that the resulting ones or minus ones to be sent to the base driver are inverted. When a switching angle has been reached, the appropriate switching signal (one or minus one) is sent to the phase A input for the base driver.

Similarly, flag FG is checked in block 144 for phase B and flag FC in block 146 for phase C.

Upon completion of the determination of the switching signals from the precalculated angles, if any, the program begins at block 130 again. This loop continues until interupt 84 or 100 is received.

Many of the functions described do not have to be carried out by software in a microcomputer but can be accomplished by analog means. The deadband control, for example, could be carried out entirely by analog methods. The calculation or storing of the switching angles however, is best done by digital means.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What is claimed is:

1. An alternating current machine drive system for providing efficiency optimal and adaptive control comprising:
   inverter means for providing variable power to the alternating current machine in response to inverter switching signals;
   means for determining a plurality of optimal switching angles per quarter period responsive to a voltage command and a frequency command and dependent on motor parameters;
   means for generating inverter switching signals responsive to said optimal switching angles;

means for generating a predicted sinusoidal motor current fundamental having means for generating a sinusoidal voltage fundamental dependent on said voltage command and said frequency command, and motor model means coupled to said sinusoidal voltage fundamental for providing the predicted sinusoidal motor current fundamental;

a deadband control having a plurality of comparator means for comparing actual motor current in each phase to a deadband having said predicted sinusoidal motor current as a reference, means for providing inverter switching signals dependent on said comparator means output with the actual current in one phase exceeding a deadband, producing a signal that will affect said one phase, and means for giving priority to said switching signals resulting from said deadband control over switching signals resulting from said optimum switching angles in connecting said inverter switching signals to said inverter.

2. The drive system of claim 1 wherein said means for giving priority to said switching signal from said deadband control comprises means for inhibiting switching signals resulting from said optimum switching angles a predetermined length of time after said deadband has been exceeded.

3. The drive system of claim 1 wherein said plurality of optimal switching angles per quarter are three.

4. The drive system of claim 1 wherein said means for determining a plurality of optimal switching angles is a look up table stored in a digital memory.

* * * * *